United States Patent [19]

Yukawa et al.

[11] 4,338,020

[45] Jul. 6, 1982

[54] DEVICE FOR DETECTING THE SIZE OF THE MATERIAL TO BE COPIED IN COPYING MACHINES

[75] Inventors: Koji Yukawa, Hachioji; Masayuki Miyazaki, Tam; Takashi Murahashi, Hachioji, all of Japan

[73] Assignee: Konishiroku Photo Industry Co., Ltd., Tokyo, Japan

[21] Appl. No.: 172,821

[22] Filed: Jul. 28, 1980

[30] Foreign Application Priority Data

Aug. 1, 1979 [JP] Japan .................................. 54-97400

[51] Int. Cl.$^{3}$ ............................................. G03B 27/52

[52] U.S. Cl. ..................................... 355/41; 250/578; 355/61; 355/75

[58] Field of Search ...................... 355/41, 55, 59, 61, 355/75, 76; 356/400; 250/557, 571, 578

[56] References Cited

U.S. PATENT DOCUMENTS 3,901,606 8/1975 Watanabe et al. ............. 250/578 X 4,244,649 1/1981 Rees et al. ........................... 355/61

FOREIGN PATENT DOCUMENTS 54-1634 1/1979 Japan .................................... 355/75

*Primary Examiner*—Richard A. Wintercorn

*Attorney, Agent, or Firm*—James E. Nilles

[57] ABSTRACT

A device for determining the size of an original or material to be copied in the copying machine wherein a color sensor is used as means for detecting the size of the original. The device comprising a colored member having a certain color, a light emitting member for throwing light upon the colored member, and a light receiving member for receiving light reflected by or transmitted through the colored member.

8 Claims, 6 Drawing Figures

DEVICE FOR DETECTING THE SIZE OF THE MATERIAL TO BE COPIED IN COPYING MACHINES

BACKGROUND OF THE INVENTION

1. Field of the Invention

This invention relates to an improvement on a device for detecting the size of the original placed on the copy board in the copying machine.

2. Description of the Prior Art

In the conventional copying machines, such as those proposed in the Japanese patent application Laid Open No. 11,242/1975, an appropriate size of copying paper is selected from among different sizes of paper or, the rolled copying paper is cut to the appropriate size according to the size of the original. The device for detecting the size of the original or the material to be copied in such copying machines comprises a light emitting member and a photoelectric conversion member, provided on the platen cover and on the underside of the copy board, respectively, along the diagonal line of the copy board so that they face each other. The size of the original is determined from the information derived from the photoelectric conversion member.

This kind of original size detection device has the disadvantage that the variation of sensitivity of the photoelectric conversion member, the variation and fluctuation of intensity of the light irradiated from the light emitting member, and external light leaking in through the gap of the platen cover are likely to result in the photoelectric conversion member or device erroneously detecting the size of the original.

Furthermore, since either the light emitting member or the photoelectric conversion member is provided to the platen cover which is opened or closed when the original is set on or taken from the copy board, the member on the platen cover is liable to trouble and the shadow of the light emitting member or the photoelectric conversion member located on the outside of the original may be printed on the transfer paper.

SUMMARY OF THE INVENTION

An object of this invention is to provide a device for detecting the size of the original or material to be copied in the copying machine, such as electrophotographic copying machine including transfer type, which device comprises at least one color sensor which is sensitive to specified color to detect the size of the original as a light receiving element.

Another object of this invention is to provide a device which comprises a colored member having a certain color; a light emitting member for throwing light upon the colored member; and a light receiving member for receiving the light which is irradiated from the light emitting member and reflected by or transmitted through the colored member; whereby the original placed on the copy board intercepts a part or whole of the light irradiated from the light emitting member toward the light receiving member and the light that went unintercepted reaches the light receiving member which in turn produces signals representing the size of the original.

Since the light receiving member consists of detector elements capable of producing signals which are proportional to the wavelength of received light without deletion to the intensitive of the light, it has no variation in sensitivity that may occur in the conventional light receiving member of the photoelectric converter which is susceptible to the variation of the light intensity of the light emitting member and to the external light leaking into it. This prevents erroneous operation of the device. This invention has another advantage: because the reflection from the colored member is used, the colored member can be provided to the platen cover and both the light emitting member and the light receiving member can be located on the underside of the copy board, so that the circuit does not have to be provided to the platen side. This contributes to reducing the probability of the circuit malfunctioning. Furthermore, where the colored member is provided to the platen side, the shadow of the colored member can be prevented from being printed on the copying or transfer paper by giving the colored member a color to which the photosensitive member is most sensitive.

In the following, we will explain this invention with reference to the accompanying drawings.

DETAILED DESCRIPTION OF THE PREFERRED EMBODIMENT

Figure 1:
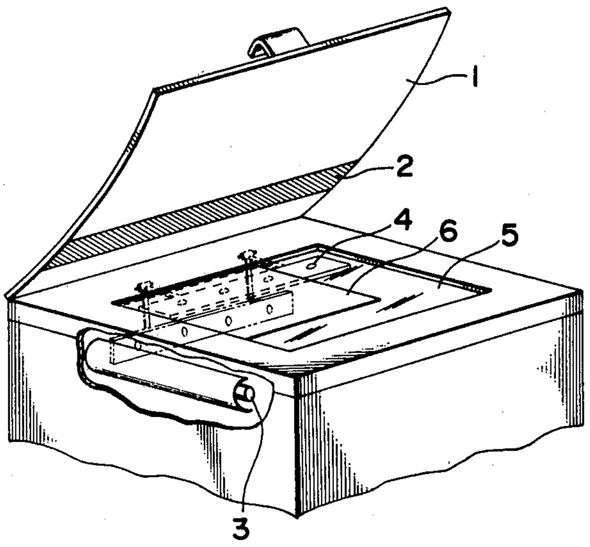
FIGS. 1 and 2 are partial perspective views of the device of this invention.

In FIG. 1, a platen cover 1 is provided with a colored member or colored portion (referred to as colored member, hereinafter) 2. Reference numeral 3 denotes a light emitting means such as halogen lamp, which also used for exposing an original 6 supported on a copy board 5 made of glass in copying operation. It is desirable that the color of colored member 2 is selected so that the reflection from colored member 2 is in a range of wavelength such that the photosensitive member (not shown) shows the most sensitivity, substantially. At least one color sensor 4 of the detector element (such as semiconductor color sensors PD-150 and PD-151 produced by Sharp Kabushiki Kaisha, Japan) is arranged in parallel on the underside of the copy board 5 to form a light receiving member (in this embodiment, four color sensors are being used). In this specification, color sensor will be called as light receiving member, sometimes. The light from the light emitting member 3, reflected by the colored member 2, is directed toward the light receiving member. The light receiving member is hinged to the machine frame so that it is retracted downward (shown by dot-and-dash line in FIG. 1) before scanning operation by the light emitting member in accordance with copying operation. The light receiving member is returned to the original position (shown by solid line) where it faces the colored member 2, by opening the platen cover 1 or by the signal produced when the required number of copies have been made. Denoted by 6 is the original or the material to be copied that is placed on the copy board 5. Light receiving members (color sensor) 4 that faces the colored member 2 without being interrupted by the original 6 generates a signal when it receives light whose wavelength is equal corresponds to that of the color of the colored member 2, while those light receiving members 4 blinded by the original 6 do not receive light from the colored member 2 and therefore do not produce outputs. The outputs from these light receiving members 4 give the size of the original. With the size of the original known, it is possible to select an appropriate size of copy paper, feed the copy papers, adjust the operating time of the fixing roller, and determine the range of movement of the projector as well as the copy board according to construction of the copying machine, at will.

For example, in a transfer type copying machine having two or more cassette for different size sheet, desired sheet is selected based on the output of the light receiving members. The construction shown in FIG. 1 has an advantage that it can be applied to either the copy board moving type or the moving type optical system including the lamp and mirrors. Detailed construction or arrangement of the copying machine is omitted because it is well known in the art. It is possible to provide the light emitting member 3 separately from the projector.

Figure 2:
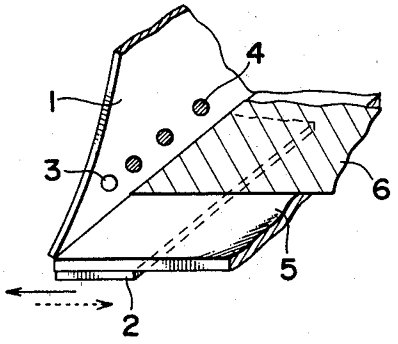

FIG. 2 shows another example in which the colored member 2 is provided on the underside of the copy board 5 and the light emitting member 3 and the light receiving members 4 are attached to the platen cover 1. If this construction is used in the copying machine having a movable copy board, the wiring circuit for the power supply and the output signals become complex, which makes it more susceptible to trouble. Therefore, this construction is mainly used in the moving type optical system (projector). Like the light receiving member in FIG. 1, the colored member 2, prior to the movement of the projector, is retracted out of the light path in the direction indicated by the solid arrow. After the platen cover 1 is opened or when the copying process is completed, the colored member 2 is returned to the original position in the direction shown by the dotted arrow.

In the construction shown in FIG. 2, the colored member 2 may be formed of transparent color plate and the light emitting member 3 may be provided to the underside of the color plate. It is also possible to use the exposing member as the light emitting member 3, as shown in FIG. 1. Where the transparent color plate is used as the colored member 2, the light receiving members 4 may of course be provided to the underside of the color plate, in which case the light receiving members 4 will be made to move out of the light path together with the colored member 2 when starting the copying process. The light receiving members 4 of FIG. 2 provide information about the size of the original, as in the case with the light receiving members shown in FIG. 1. In the embodiment of the present invention, the member 2 is colored with yellow and selenium-tellurium photosensitive member or zinc oxide having sensitizing function is used as a color sensor. However, it will be appreciated that other color may, of course, be used if the other type of color sensor is used.

Figure 3:
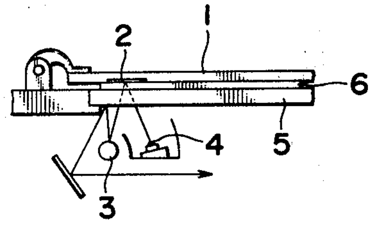
FIG. 3 is a side view of a portion of another embodiment.

FIG. 3 shows still another example which uses the exposing member as the light emitting member 3 as in FIG. 1. In this case, the copying is performed either by moving the copy board to the right and the left or by reciprocating right and left the light emitting member 3 together with the light receiving member 4 consisting of the color sensors. Member (no reference numeral) provided at the left side of the light emitting member is a mirror for reading the original image on to the photosensitive member.

Figure 4:
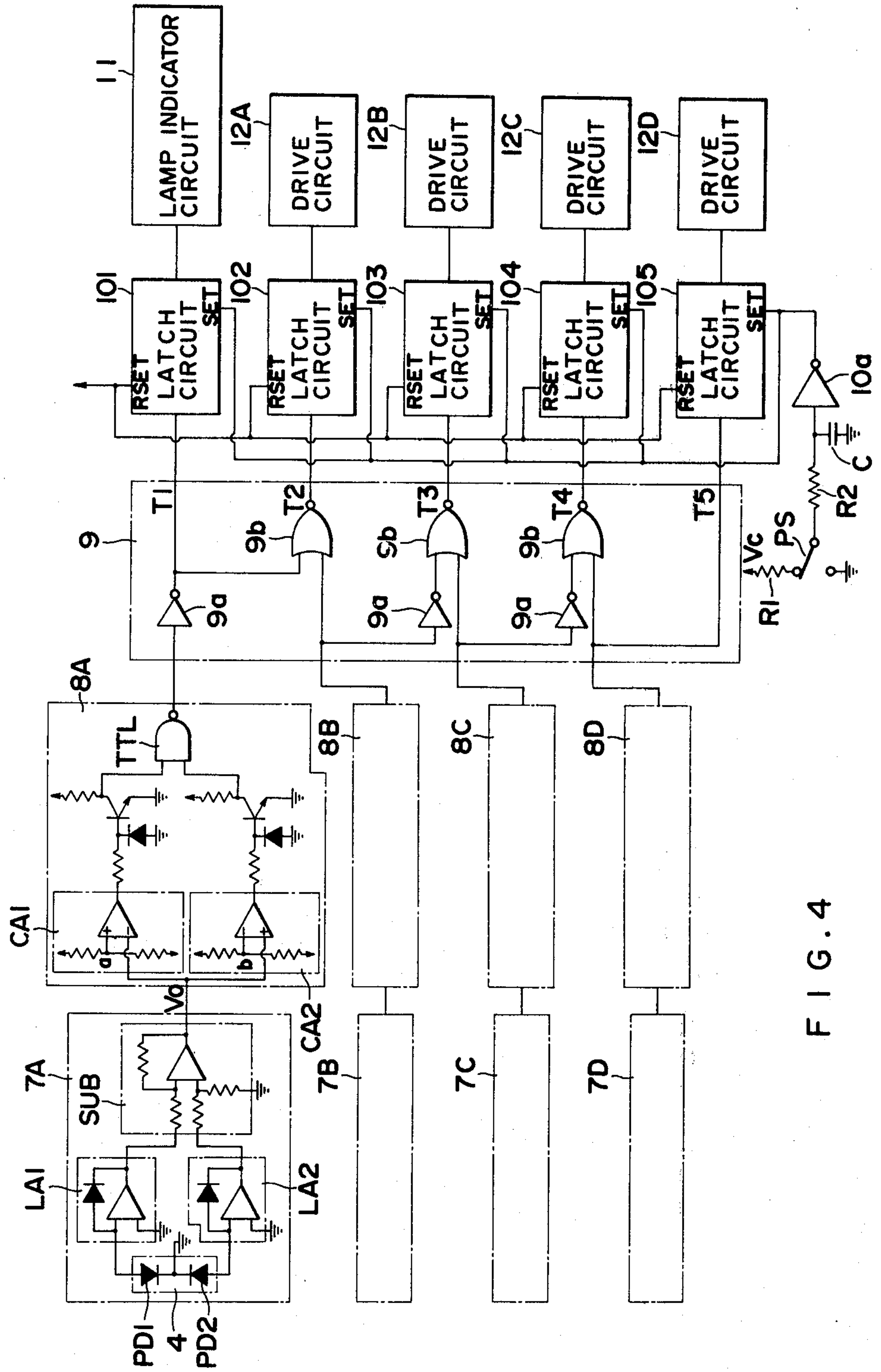
FIG. 4 is an electric circuit of the device.

The use of the circuit shown in FIG. 4 combined with the original size detecting device of FIGS. 1 through 3 makes it possible to determine the size of the original and select and feed the copy paper of proper size.

Referring to FIG. 4, reference symbols 7A through 7D represent color sensor units located opposite to the original to be copied; 8A through 8D binary level detectors; 9 a logic circuit; 101 through 105 latch circuits; 11 a lamp indicator circuit; and 12A through 12D drive circuits for feeding the copying papers of various sizes. It will be appreciated from the description as mentioned above two or more cassette are prepared in the copying machine for the copying papers of various sizes such as A3, A4, B4 and B5 in this embodiment.

All the color sensor units 7A through 7D have an identical circuit. The outputs of the photodiodes PD1, PD2 contained in the color sensor 4 and having different spectral sensitivities are sent to logarithmic amplifiers LA1, LA2. The logarithmically amplified signals are then inputted to a subtraction circuit SUB which produces voltage $V_O$ which is independent of the intensity of received light but proportional to the wavelength detected. That is, the voltage $V_O$ may be expressed as $$V_O \propto \log I_{SC2} - \log I_{SC1} = \log(I_{SC2}/I_{SC1})$$

where $I_{SC1}$ and $I_{SC2}$ are the output currents of the photodiodes PD1, PD2.

The binary level detectors 8A through 8D have the same circuit and each detector, upon receiving the voltage $V_O$ which is proportional to the wavelength detected by the color sensor units 7A through 7D, determines whether the wavelength thus detected corresponds to the color of the color plate. To describe in more detail, the output voltage $V_O$ of the color sensor units 7A through 7D are fed to the negative input terminal of a comparator CA1 and to the positive input terminal of a comparator CA2. The comparator CA1 compares the voltage $V_O$ with the reference voltage a supplied to the positive input terminal, which is set somewhat higher than the voltage corresponding to the predetermined wavelength. The other comparator CA2 compares the voltage $V_O$ with the reference voltage b supplied to the negative input terminal, which is set somewhat lower than the voltage corresponding to the predetermined wavelength. When the voltage $V_O$ is lower than the voltage a, the comparator CA1 outputs a high level signal H and, when $V_O$ is higher, outputs a low level signal L. The comparator CA2 outputs a low level signal L when $V_O$ is smaller than b and a high level signal H when $V_O$ is higher than b. The output signals from these comparators CA1, CA2 are then processed in a transistor-transistor logic circuit TTL which outputs a low level signal L when the voltage $V_O$ is higher than a but lower than b, and a high level signal H when $V_O$ is smaller than a or larger than b. By this process, the binary level detectors 8A through 8D can determine whether or not the light with the specified wavelength has been received.

The relation between the input and output of the binary level detectors is shown in Table 1.

TABLE 1

| Input voltage | CA1 output | CA2 output | TTL input 1 | TTL input 2 | TTL output |
|---|---|---|---|---|---|
| $V_O < a$ | H | L | L | H | H |
| $a < V_O < b$ | L | L | H | H | L |
| $V_O > b$ | L | H | H | L | H |

When output signals of the binary level detectors 8A through 8D as shown above are supplied to the logic circuit 9, the logic circuit 9, based on these signals, operates one of the drive circuits 12A through 12D, through the latch circuit, to feed appropriate size of copy paper. That is, the output of the drive circuit operates one of feeding rollers (not shown) detected with sheets stocked in the cassette, separately, for different size of papers through a motor or a clutch and so on. In case the original to be copied is not placed on the copy board, a signal is sent, through the latch circuit 101, to the indicator circuit 11 to turn on the indication lamp. At this time, the color sensor 4 of the color sensor unit 7A is in a position to detect the minimum size of the paper on the copy board. We will explain in the following how the logic circuit 9 functions for four different paper sizes.

The color sensor units 7A through 7D correspond to various paper sizes ranging from the smallest paper size A to the largest D. When an original of size A is placed on the copy board in a predetermined position, the original intercepts the light transmitted through or reflected by the color plate thereby blocking it from entering the color sensor 4 of the color sensor unit 7A, while permitting the light to enter the other color sensors 4. When an original of size B is placed in position, the light is intercepted from entering the color sensors 4 of the color sensor units 7A, 7B. Likewise, an original of the largest size D intercepts light from all color sensors 4 of the color sensor units 7A–7D. As can be seen from the foregoing description on the color sensor units and the binary level detectors, the output signals of the binary level detectors 8A–8D assume the levels as shown in the truth table of Table 2, according to the size of original.

TABLE 2

Truth Table

| Output signal | Size of original: None | A | B | C | D |
|---|---|---|---|---|---|
| 8A | 0 | 1 | 1 | 1 | 1 |
| 8B | 0 | 0 | 1 | 1 | 1 |
| 8C | 0 | 0 | 0 | 1 | 1 |
| 8D | 0 | 0 | 0 | 0 | 1 |

NOTE:
"None" in the column of the original size represents the case where no original to be copied is placed on the copy board. "1" represents a high level and "0" a low level.

When the output signals of the detectors 8A–8D as shown in Table 2 are fed to the logic circuit 9 consisting of inverter circuits 9a and NOR circuits 9b, the logic circuit 9 produces signals at the output terminals T1 through T5 as shown in Table 3.

TABLE 3

Truth Table

| Output signal | Size of original: None | A | B | C | D |
|---|---|---|---|---|---|
| T1 | 1 | 0 | 0 | 0 | 0 |
| T2 | 0 | 1 | 0 | 0 | 0 |
| T3 | 0 | 0 | 1 | 0 | 0 |
| T4 | 0 | 0 | 0 | 1 | 0 |
| T5 | 0 | 0 | 0 | 0 | 1 |

When no original is placed on the copy board, the signals from the output terminals T1 through T5 drive the latch circuit 101 to turn on the lamp of indicator 11 and if the original of any size from A to D is placed in position, these output signals drive one of the latch circuits 102–105 to operate the corresponding one of the drive circuits 12A–12D, thereby feeding the appropriate size of copy paper.

When the platen cover 1 of FIGS. 1, 2 is closed, a platen cover switch PS is connected to the power supply Vc so that a capacitor C is charged through resistors R1, R2. The charging voltage of the capacitor C is inverted by an inverter 10a to make the signal go low. The low level signal is then applied to the set terminals SET of the latch circuits 101–105. When the set terminals SET are applied with the low level signal, one of the circuits—the lamp indicator circuit 11 and the drive circuits 12A–12D—to which a high level signal is being inputted from any one of the output terminals T1–T5 of the logic circuit 9 is connected to the power supply. The latch circuit that has been set remains as it is until it receives a reset signal at the reset terminal RSET. When the platen cover 1 is opened, the switch PS is connected to the ground, discharging the capacitor C with the result that the signal being applied to the set terminals of the latch circuits 101–105 through the inverter 10a rises thereby resetting the latch circuits 101–105. The latch circuits 102–105 for the drive circuits 12A–12D can be reset by a signal produced when the copying process is completed. To reset the latch circuits when the pulse from the inverter 10a rises, the reset terminals RSET must be made common with the set terminals SET.

Because of the latch circuits 101–105, any one of the lamp indicator circuit 11 and the drive circuits 12A–12D that has been driven continues its operation until the reset signal is inputted to the reset terminal RSET. That is, the lamp indicator circuit 11 and the drive circuits 12A–12D will remain operated state even if the output signal from the color sensor 4 ceases when the light receiving member of FIGS. 1, 2 retracts as the copying process starts, or if the output signal from the color sensor 4 is generated again as the light receiving member of FIG. 3 reciprocates across the copy board, as far as the reset signal is not inputted to the reset terminal RSET. When turned on, the drive circuits 12A–12D automatically indicate on the copying machine the size of the original to be copied or the size of the copy paper to be fed and, by means of a clutch, feed the required number of copy papers of selected size subsequently at the predetermined timing. In this way, the appropriate size of copy paper is automatically fed a required number of times.

Figure 5:
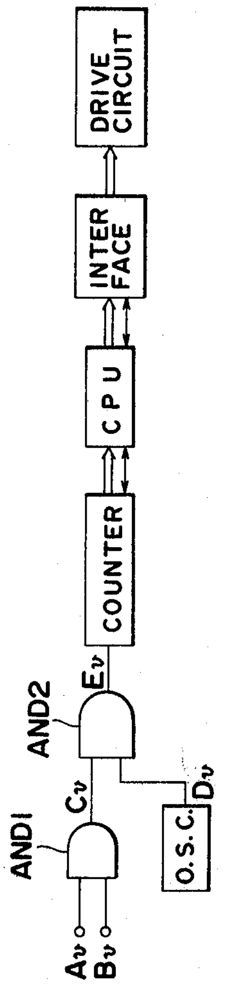
FIG. 5 is a block diagram of another embodiment.

In a device of FIG. 3 in which the light emitting member 3 and the light receiving member 4 consisting of the color sensor reciprocate across the colored member 2 in the longitudinal direction thereof, the circuit shown in FIG. 5 may be used to detect the size of the original and feed the copy paper of the corresponding size. In this case, only a single color sensor 4 is needed while it is necessary to move the light receiving member to scan the original and detect its size, before starting the copying process.

The circuit of FIG. 5 will be explained here. An AND circuit AND1 receives a start signal Bv, and a signal Av from the color sensor which is produced when the light receiving member 4 scans the original to be copied. The output signal Cv of the AND circuit AND1 and the pulse signal Dv from the oscillator are inputted to a second AND circuit AND2, from which a signal E is derived to the counter which counts the number of pulses corresponding to the size of the original to be copied. The counted value is fed to a CPU which, through the interface, drives the corresponding drive circuit to feed the appropriate size of copy paper.

Figure 6:
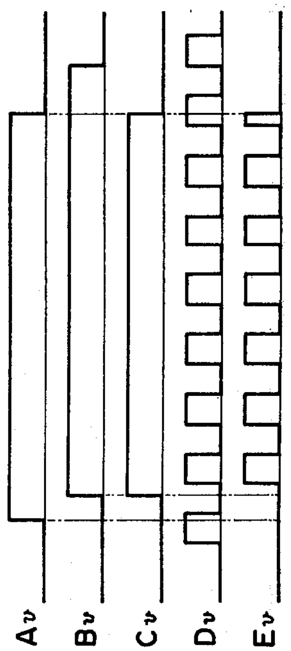
FIG. 6 is a time chart of signals produced at respective blocks of FIG. 5.

FIG. 6 shows the timing of these signals. The signal Av from the color sensor is low while the color sensor is moving over the portion of the colored member that is not covered by the original, and goes high when it detects the original.

The start signal Bv is used to specify the timing at which to start counting the number of pulses. The start signal may be obtained, for example, by providing a microswitch near the starting point of scanning by the color sensor. When the sensor for the start signal hits the microswitch, the start signal Bv goes high and remains high for a predetermined period of time which is longer than the longest time during which any signal Av from the color sensor remains high. After the predetermined period of time, the start signal Bv goes low. If the position at which the signal Av goes high is always constant, the start signal Bv is not necessary and therefore the signal Av can be directly applied to the AND2. This obviates the AND1. The number of pulses of the signal Ev gives the size of the original.

As can be seen from the foregoing, the device of this invention has the following advantages: since the color sensors are employed to determine the size of the original, accurate detection of the size is possible; and since the light reflected by the colored member is used to detect the size of the original, it is possible to provide the light emitting member and the color sensors on the underside of the copy board, so that the device of this invention can be applied to either the copy board reciprocating type or the projector reciprocating type copying machine.

Where small size originals, such as photographs and chit or slips, are arranged to be copied with a larger size copying machine, it is likely for the machine to mistake by the gap between the originals, accordingly it is recommended that the ordinary method of paper feeding be used to prevent the error.

In the present invention, further, if the color sensors are arranged not only in the transverse direction but also in the longitudinal direction, the device of the present invention can be applied for the system in which the copying papers can be fed to both the transverse and longitudinal directions by detecting the signals of the sensors arranged in the both directions.

If the original has the colored background, the bias voltage at the developing portion must be controlled. In the present invention, such control can be effected by using the outputs of the color sensors. It may be possible to vary the output of the lamp of the copying machine by using the outputs of the color sensors.

What is claimed is:

1. A device for determining the size of an original or material to be copied in the copying machine so that appropriately sized transfer paper can be selected and fed in the copying machine comprising a colored member having a certain color and which is used as means for detecting the size of the original; a light emitting member for throwing light upon the colored member; and a light receiving member responsive to said certain color for receiving light which has impinged upon the colored member; whereby at least a part of the light irradiated from the light emitting member to the light receiving member is intercepted by the original placed on the copy board so as to cause the light receiving member to provide an output signal indicative of the size of the original.

2. A device as set forth in claim 1, wherein the light irradiated from the light emitting member is reflected by the colored member on which it impinges and then enters the light receiving member consisting of color sensors.

3. A device as set forth in claim 1 or 2, wherein the colored member is formed of that part of the inner surface of the platen cover which is given a certain color.

4. A device as set forth in claim 1, wherein the light irradiated from the light emitting member is transmitted through the light-permeable colored member on which it impinges and then enters the light receiving member consisting of color sensors.

5. A device as set forth in claim 1 or 2 or 4 wherein the selection and feeding of the transfer paper are performed in accordance with the signals from the light receiving member which represent the size of the original.

6. A device as set forth in claim 1 or 2 or 5 further comprising an indicator on the copying machine which indicates the size of the original in accordance with the signals from the light receiving member.

7. A device as set forth in claim 1 or 2 or 5 wherein the lamp for exposing the original is also used as the light emitting member.

8. A device as set forth in claim 1 or 2 or 4 wherein the light emitting member located on the platen side of the copy board and the colored member located on the other side and facing the light receiving member are retracted from the copy board prior to the process of exposing the material to be copied.

* * * * *